United States Patent
Ohashi et al.

(10) Patent No.: US 12,003,962 B2
(45) Date of Patent: Jun. 4, 2024

(54) COMMUNICATION SYSTEM AND COMMUNICATION DEVICE

(71) Applicant: KABUSHIKI KAISHA TOKAI RIKA DENKI SEISAKUSHO, Aichi (JP)

(72) Inventors: Yosuke Ohashi, Aichi (JP); Masateru Furuta, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 347 days.

(21) Appl. No.: 17/600,847

(22) PCT Filed: Apr. 7, 2020

(86) PCT No.: PCT/JP2020/015654
§ 371 (c)(1),
(2) Date: Oct. 1, 2021

(87) PCT Pub. No.: WO2020/209248
PCT Pub. Date: Oct. 15, 2020

(65) Prior Publication Data
US 2022/0167162 A1    May 26, 2022

(30) Foreign Application Priority Data

Apr. 12, 2019 (JP) .................................. 2019-076299
Mar. 24, 2020 (JP) .................................. 2020-052415

(51) Int. Cl.
*H04L 29/06* (2006.01)
*H04W 4/40* (2018.01)
(Continued)

(52) U.S. Cl.
CPC ............. *H04W 12/06* (2013.01); *H04W 4/40* (2018.02); *H04W 12/03* (2021.01)

(58) Field of Classification Search
CPC ....... H04W 12/03; H04W 12/06; H04W 4/40; H04L 63/12
See application file for complete search history.

(56) References Cited

U.S. PATENT DOCUMENTS 6,025,653 A    2/2000  Hayashi et al.
9,210,140 B2 * 12/2015  Pope .................... G06F 21/572
(Continued)

FOREIGN PATENT DOCUMENTS

CN    1671099     9/2005
CN    107672557   2/2018
(Continued)

OTHER PUBLICATIONS

International Search Report issued in International Bureau of WIPO Patent Application No. PCT/JP2020/015654, dated Jun. 30, 2020, along with an English translation thereof.
(Continued)

*Primary Examiner* — Joseph P Hirl
*Assistant Examiner* — Chi D Nguy
(74) *Attorney, Agent, or Firm* — GREENBLUM & BERNSTEIN, P.L.C.

(57) ABSTRACT

[Object] To provide a novel and improved communication system and communication device that make it possible to reduce an amount of time from when communication with an external device is completed to when communication data corresponding to a communication result is output to another device.

[Solution] Provided is a communication system including: a communication device configured to transmit a selection solution that is selected depending on a result of first communication with an external device; and a control device configured to receive the selection solution from the communication device through second communication between
(Continued)

the communication device and a communication partner that is different from the external device serving as a communication partner in the first communication.

12 Claims, 6 Drawing Sheets

(51) Int. Cl.
*H04W 12/03* (2021.01)
*H04W 12/06* (2021.01)

(56) References Cited

U.S. PATENT DOCUMENTS

| | | | |
|---|---|---|---|
| 9,836,892 B1 | 12/2017 | Nishiyama et al. | |
| 10,685,124 B2 * | 6/2020 | Amano | H04L 12/40006 |
| 10,700,860 B2 * | 6/2020 | Walrant | H04L 9/0891 |
| 2005/0235152 A1 | 10/2005 | Ozaki et al. | |
| 2006/0152348 A1 * | 7/2006 | Ohtaki | B60R 25/24 |
| | | | 340/426.1 |
| 2018/0068107 A1 * | 3/2018 | Takemori | H04L 9/08 |
| 2019/0065732 A1 * | 2/2019 | Woo | G06F 1/3287 |
| 2019/0281052 A1 * | 9/2019 | Lekkas | H04L 9/14 |
| 2020/0092098 A1 * | 3/2020 | Zeh | G06F 21/72 |

FOREIGN PATENT DOCUMENTS

| | | |
|---|---|---|
| JP | 09-277906 | 10/1997 |
| JP | 2005-022491 | 1/2005 |
| JP | 2005-138633 | 6/2005 |
| JP | 2010-011400 | 1/2010 |
| JP | 2012-36582 | 2/2012 |

OTHER PUBLICATIONS

Written Opinion issued in International Bureau of WIPO Patent Application No. PCT/JP2020/015654, dated Jun. 30, 2020.

* cited by examiner

FIG. 5

| ROW NUMBER | NOTIFICATION TO VERIFICATION ECU | RESULT OF DETERMINING MEASUREMENT VALUE BY MASTER COMMUNICATION DEVICE | RESULT OF DETERMINING MEASUREMENT VALUE BY SLAVE COMMUNICATION DEVICE |
|---|---|---|---|
| 1 | VALID (SECOND ENCRYPTION SELECTION SOLUTION C) | VALID | VALID |
| 2 | VALID (SECOND ENCRYPTION SELECTION SOLUTION C) | VALID | INVALID |
| 3 | VALID (SECOND ENCRYPTION SELECTION SOLUTION C) | INVALID | VALID |
| 4 | INVALID (SECOND ENCRYPTION SELECTION SOLUTION D) | INVALID | INVALID |
| 5 | VALID (SECOND ENCRYPTION SELECTION SOLUTION C) + ENCRYPTION SOLUTION INCONSISTENCY | VALID | ENCRYPTION SOLUTION INCONSISTENCY |
| 6 | INVALID (SECOND ENCRYPTION SELECTION SOLUTION D) + ENCRYPTION SOLUTION INCONSISTENCY | ENCRYPTION SOLUTION INCONSISTENCY | VALID |
| 7 | INVALID (SECOND ENCRYPTION SELECTION SOLUTION D) + ENCRYPTION SOLUTION INCONSISTENCY | ENCRYPTION SOLUTION INCONSISTENCY | ENCRYPTION SOLUTION INCONSISTENCY |

COMMUNICATION SYSTEM AND COMMUNICATION DEVICE

TECHNICAL FIELD

The present invention relates to a communication system and a communication device.

BACKGROUND ART

Conventionally, there have been communication systems that perform communication between communication devices and external devices (for example, JP 2012-036582A). For example, sometimes the communication device outputs communication data to another device. The communication data is generated by processing a result derived through the communication between the communication device and the external device. In such a case, the communication device derives the result, the result is processed, and then the communication data is generated in general.

CITATION LIST

Patent Literature

Patent Literature 1: JP 2012-036582A

DISCLOSURE OF INVENTION

Technical Problem

However, such systems have a problem that it takes time to complete transmission of the communication data if the communication data is generated after the communication device derives the result. Accordingly, the present invention is made in view of the aforementioned issue, and an object of the present invention is to provide a novel and improved communication system and communication device that make it possible to reduce an amount of time from when communication with an external device is completed to when communication data corresponding to a communication result is output to another device.

Solution to Problem

To solve the above-described problems, according to an aspect of the present invention, there is provided a communication system including: a communication device configured to transmit a selection solution that is selected depending on a result of first communication with an external device; and a control device configured to receive the selection solution from the communication device through second communication between the communication device and a communication partner that is different from the external device serving as a communication partner in the first communication.

In addition, to solve the above-described problems, according to an aspect of the present invention, there is provided a communication device including: an acquisition section configured to acquire a selection solution that is selected depending on a result of first communication with an external device; and a communication section configured to transmit the selection solution to a control device through second communication with a communication partner that is different from the external device serving as a communication partner in the first communication.

Advantageous Effects of Invention

As described above, according to the present invention, it is possible to provide a communication system and a communication device that are capable of suppressing increase in processing time.

BRIEF DESCRIPTION OF DRAWINGS

FIG. 5 is a table showing examples of correspondence relations among notifications to the verification ECU, results of determining measurement values by a master communication device, and results of determining measurement values by a slave communication device.

MODE(S) FOR CARRYING OUT THE INVENTION

Hereinafter, referring to the appended drawings, preferred embodiments of the present invention will be described in detail. Note that, in this specification and the appended drawings, structural elements that have substantially the same function and structure are denoted with the same reference signs, and repeated explanation of these structural elements will be omitted.

1. Embodiment

Hereinafter, an embodiment of a communication system will be described with reference to FIG. 1 to FIG. 4.

1.1. Configuration Example

Figure 1:
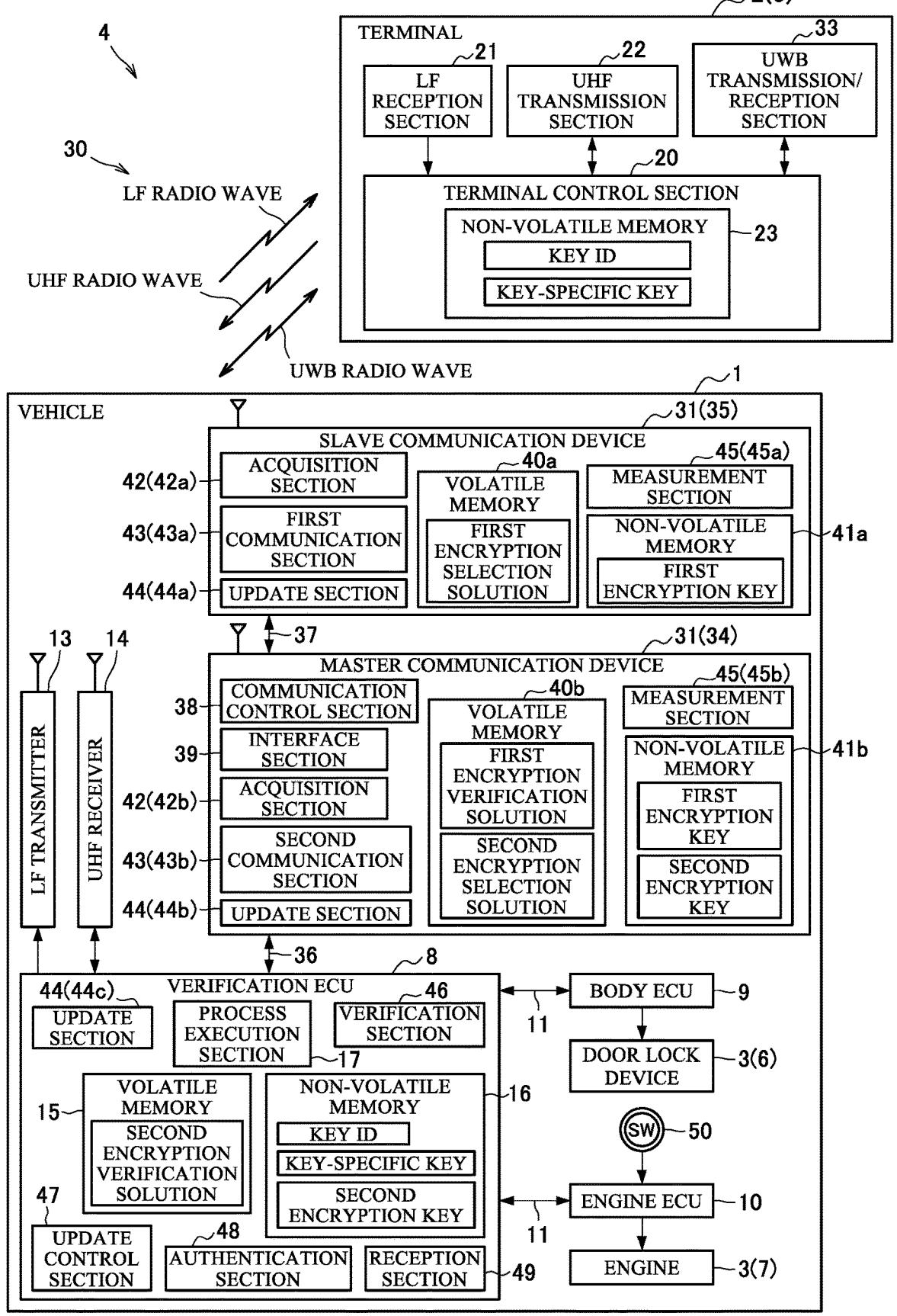
FIG. 1 is a block diagram illustrating a configuration example of a communication system.

A configuration example of the communication system according to the present embodiment will be described with reference to FIG. 1. As illustrated in FIG. 1, the communication system according to the present embodiment includes an electronic key system 4. The electronic key system 4 controls whether or not to actuate an in-vehicle device 3 by wirelessly confirming whether or not a terminal 2 is valid (by authenticating the terminal 2). More specifically, the electronic key system 4 according to this example is a smart verification system that executes ID verification (hereinafter, also referred to as "smart verification") for checking a key ID (ID information) received by one of a vehicle 1 and the terminal 2 against a key ID registered on the one of the vehicle 1 and the terminal 2 in the case where the other of the vehicle 1 and the terminal 2 transmits the key ID necessary for authentication and the one of the vehicle 1 and the terminal 2 receives the key ID.

This example mainly focuses on the case where the vehicle 1 executes the smart verification, and details thereof will be described later. However, it is also possible for the terminal 2 to execute the smart verification. In addition, the smart verification is an example of authentication of the terminal 2 through wireless communication. Therefore, the method of authenticating the terminal 2 is not limited to the smart verification. In the case where the electronic key system 4 executes the smart verification, the terminal 2 is desirably an electronic key 5 as illustrated in FIG. 1. For example, the electronic key 5 is used for the smart verification through wireless communication with the vehicle 1, and has a key function of actuating the in-vehicle device 3 on the basis of the smart verification.

(Structural Elements of Vehicle)

Next, structural elements of the vehicle 1 will be described. The vehicle 1 includes the in-vehicle device 3, a verification electronic control unit (ECU) 8, a body ECU 9, an engine ECU 10, a low frequency (LF) transmitter 13, an ultra high frequency (UHF) receiver 14, and a communication device 31. As illustrated in FIG. 1, examples of the in-vehicle device 3 include a door lock device 6 and an engine 7 of the vehicle 1. The door lock device 6 controls whether to lock or unlock a vehicle door.

The verification ECU 8 includes volatile memory 15, non-volatile memory 16, a process execution section 17, an update section 44c, a verification section 46, an update control section 47, an authentication section 48, and a reception section 49. The authentication section 48 executes the smart verification, and authenticates the terminal 2 through the smart verification. The non-volatile memory 16 of the verification ECU 8 stores a key ID specific to the terminal 2 and a key-specific key. The key ID and the key-specific key are used for the smart verification. Details of the volatile memory 15, the process execution section 17, the update section 44c, the verification section 46, the update control section 47, and the reception section 49 will be described later.

The body ECU 9 manages a power supply of in-vehicle electric equipment. For example, the body ECU 9 controls the door lock device 6 that switches between a locked state and an unlocked state of the vehicle door. In addition, the engine ECU 10 controls the engine 7. The verification ECU 8, the body ECU 9, and the engine ECU 10 are connected via communication lines 11 in the vehicle 1. For example, a protocol used for communication via the communication lines 11 may be a Controller Area Network (CAN) or a Local Interconnect Network (LIN).

The LF transmitter 13 transmits an LF radio wave to the terminal 2 to execute communication for the smart verification of the vehicle 1 and the terminal 2. In addition, when the terminal 2 receives the LF radio wave and transmits an UHF radio wave, the UHF receiver 14 receives the UHF radio wave transmitted from the terminal 2. Note that, for example, the LF transmitter 13 preferably includes an outdoor LF transmitter and an indoor LF transmitter. The outdoor LF transmitter transmits a radio wave to a terminal 2 that is located outside the vehicle 1. The indoor LF transmitter transmits a radio wave to a terminal 2 that is located inside the vehicle 1. Details of the communication device 31 will be described later.

(Structural Elements of Terminal)

Next, structural elements of the terminal 2 will be described. The terminal 2 includes a terminal control section 20, an LF reception section 21, an UHF transmission section 22, and an ultra-wideband (UWB) transmission/reception section 33. The terminal control section 20 controls the terminal 2. The terminal control section 20 includes non-volatile memory 23. The non-volatile memory 23 of the terminal control section 20 stores the key ID specific to the terminal 2 and the key-specific key. The key ID and the key-specific key are used for the smart verification.

The LF reception section 21 receives the LF radio wave transmitted from the vehicle 1 to execute communication for the smart verification of the vehicle 1 and the terminal 2. When the LF reception section 21 receives the LF radio wave transmitted from the vehicle 1, the UHF transmission section 22 transmits an UHF radio wave to the vehicle 1. Details of the UWB transmission/reception section 33 will be described later.

(Smart Verification)

Next, a flow of the smart verification will be described. First, the LF transmitter 13 of the vehicle 1 transmits an wake signal periodically or randomly on a low frequency (LF). When the LF reception section 21 receives the wake signal, the terminal 2 shifts from a standby state to an activated state, and the UHF transmission section 22 transmits an ACK signal on an ultra high frequency (UHF). When the UHF receiver 14 receives the ACK signal transmitted from the terminal 2 in response to the wake signal, the authentication section 44 of the verification ECU 8 starts the smart verification. At this time, the authentication section 44 of the verification ECU 8 executes outdoor smart verification between an outdoor terminal 2 and the vehicle 1 in the case where the outdoor terminal 2 receives a wake signal from the outdoor LF transmitter 13. On the other hand, the authentication section 44 of the verification ECU 8 executes indoor smart verification between an indoor terminal 2 and the vehicle 1 in the case where the indoor terminal 2 receives a wake signal from the indoor LF transmitter 13.

Here, the smart verification may include key ID verification or may include request response authentication. The key ID verification is confirmation of whether a key ID registered on the terminal 2 is identical to a key ID pre-registered on the vehicle 1. The request response authentication uses the key-specific key. The request response authentication is authentication for confirming whether response codes are identical to each other by causing the vehicle 1 and the terminal 2 to compute the respective response codes using the key-specific key in response to request codes, which are random numbers. This example mainly focuses on a case where both the key ID verification and the request response authentication succeeds and thereby the authentication section 44 of the verification ECU 8 considers that the smart verification succeeds.

(Distance Measurement System)

As illustrated in FIG. 1, the communication system according to the present embodiment includes a distance measurement system 30. Hereinafter, the distance measurement system 30 will be described. Note that, the distance measurement system 30 directly measures a measurement value Vm corresponding to a distance between the vehicle 1 and the terminal 2. However, to simplify the description, sometimes this specification states that the distance measurement system 30 measures the distance between the vehicle 1 and the terminal 2.

Here, in the case where the terminal 2 is far away from the vehicle 1, communication connection is not established between the vehicle 1 and the terminal 2 and the smart verification does not succeed in a usual case. However, sometimes fraudulent behavior may be performed in such a manner that a relay or the like is used to establish the communication connection between the vehicle 1 and the terminal 2, which is far away from the vehicle 1, and to achieve success in the smart verification. To deal with such fraudulent behavior, the distance measurement system 30 has the function of measuring the measurement value Vm corresponding to the distance between the vehicle 1 and the terminal 2, and a function of deciding whether or not the smart verification has succeeded on the basis of validity of the measurement value Vm (fraudulent communication detection function).

The distance measurement system is mainly achieved by the UWB transmission/reception section 33 included in the terminal 2 and the communication device 31 included in the vehicle 1. The UWB transmission/reception section 33 executes communication with the communication device 31 to measure a distance. In addition, the communication device 31 executes communication with the terminal 2 to measure the distance. This example mainly focuses on a case where the vehicle 1 is provided with a plurality of the communication devices 31 (in particular, a master communication device 34 and a slave communication device 35). However, the number of communication devices 31 of the vehicle 1 is not limited.

In this example, the master communication device 34 is connected to the verification ECU 8 via a communication line 36. The slave communication device 35 is connected to the master communication device 34 via a communication line 37. For example, the LIN or CAN may be used as a communication protocol for the communication via the communication line 36 and the communication line 37. Note that, a communication interface such as a universal asynchronous receiver-transmitter (UART) may be used for the communication line 36.

The master communication device 34 includes a communication control section 38, an interface section 39, volatile memory 40*b*, non-volatile memory 41*b*, an acquisition section 42*b*, a second communication section 43*b*, an update section 44*b*, and a measurement section 45*b*. The interface section 39 is an interface capable of communicating with the verification ECU 8 and the slave communication device 35. For example, the interface section 39 outputs an actuation signal to the slave communication device 35. The communication control section 38 controls actuation of the slave communication device 35. In the case where the vehicle 1 includes a plurality of the slave communication devices 35 or in other cases, the communication control section 38 sets an order of actuation of the plurality of slave communication devices 35, or selectively actuates some of the slave communication devices 35, for example. Details of the volatile memory 40*b*, the non-volatile memory 41*b*, the acquisition section 42*b*, the second communication section 43*b*, the update section 44*b*, and the measurement section 45*b* will be described later.

The slave communication device 35 includes volatile memory 40*a*, non-volatile memory 41*a*, an acquisition section 42*a*, an update section 44*a*, and a measurement section 45*a*. Details of the volatile memory 40*a*, the non-volatile memory 41*a*, the acquisition section 42*a*, the first communication section 43*a*, the update section 44*a*, and the measurement section 45*a* will be described later.

Figure 2:
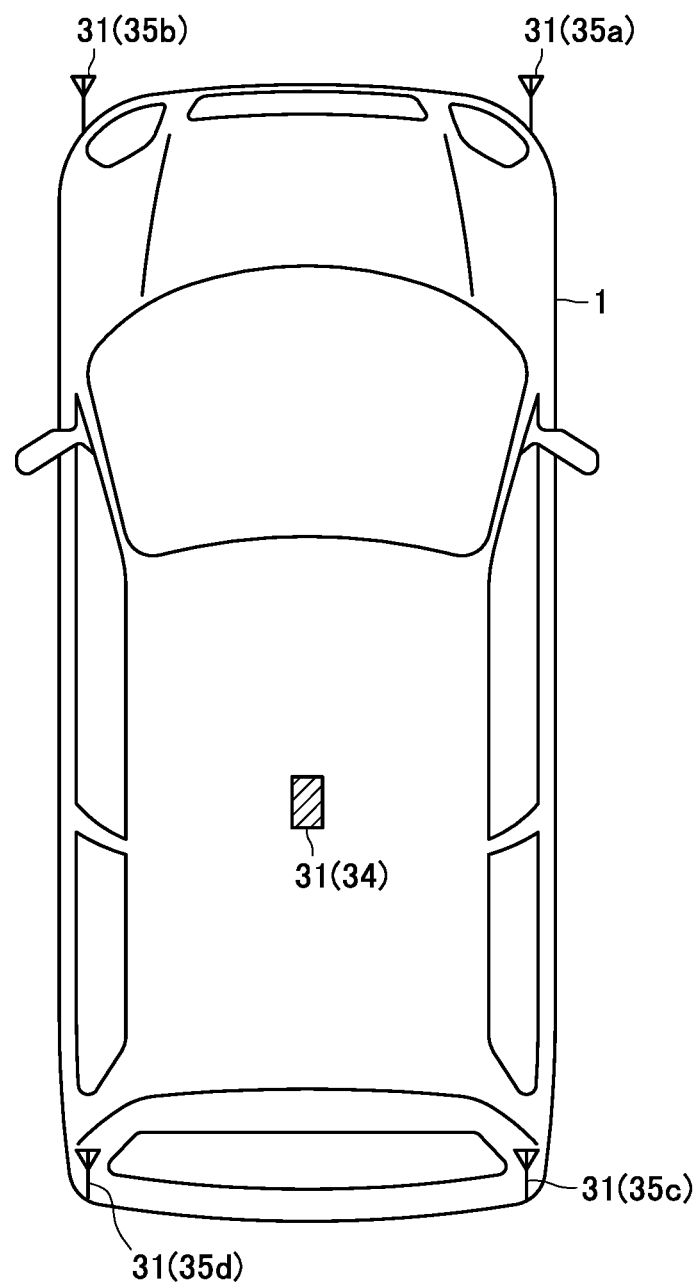
FIG. 2 is a diagram illustrating arrangement of communication devices in a vehicle.

Here, an example of installation of the communication devices 31 will be described with reference to FIG. 2. In the example illustrated in FIG. 2, the communication devices 31 are installed at five different positions on the vehicle 1. Among the communication devices 31, the master communication device 34 is installed inside the vehicle 1 to transmit a ranging radio wave in a vehicle interior. Details of the ranging radio wave will be described later. A first slave communication device 35*a* is installed in a corner of the vehicle 1 (in front of a driver's seat) to transmit the ranging radio wave toward the front of the vehicle 1 or toward the driver's seat. The second slave communication device 35*b* is installed in a corner of the vehicle 1 (in front of a front passenger seat) to transmit the ranging radio wave toward the front of the vehicle 1 or toward the front passenger seat.

A third slave communication device 35*c* is installed in a corner of the vehicle 1 (in back of the driver's seat) to transmit the ranging radio wave toward the back of the vehicle 1 and or toward the driver's seat. The fourth slave communication device 35*d* is installed in a corner of the vehicle 1 (in back of the front passenger seat) to transmit the ranging radio wave toward the back of the vehicle 1 or toward the front passenger seat. Note that, the arrangement of the communication devices 31 is not limited to the above-described example.

Referring again to FIG. 1, each of the non-volatile memory 41*a* of the slave communication device 35 and the non-volatile memory 41*b* of the master communication device 34 stores a first encryption key. In other words, the first encryption key used by the slave communication device 35 is common to the first encryption key used by the master communication device 34. In addition, each of the non-volatile memory 41*b* of the slave communication device 34 and the non-volatile memory 16 of the verification ECU 8 stores a second encryption key. In other words, the second encryption key used by the master communication device 34 is common to the second encryption key used by the verification ECU 8.

This example mainly focuses on a case where the first encryption key stored in the non-volatile memory 41*a* of the slave communication device 35 and the non-volatile memory 41*b* of the master communication device 34 is different from the second encryption key stored in the non-volatile memory 41*b* of the master communication device 34 and the non-volatile memory 16 of the verification ECU 8. However, the first encrypt ion key may be identical to the second encryption key. Note that, respective ways of using the first encryption key and the second encryption key in the case will be described later in detail.

(Communication for Distance Measurement)

Next, communication for distance measurement and notification of a result of determining a measurement value will be described. For example, when the verification ECU 8 outputs a distance measurement request, the interface section 39 of the master communication device 34 accepts input of the distance measurement request from the verification ECU 8. When the interface section 39 accepts the input of the distance measurement request, the communication control section 38 outputs the distance measurement request to the slave communication device 35 via the interface section 39. Note that, the verification ECU 8 may output the distance measurement request when the smart communication is established (for example, when the vehicle 1 receives an ACK signal from the terminal 2 in response to a wake signal transmitted from the vehicle 1), or when the outdoor smart verification or the indoor smart verification has succeeded.

When the communication devices 31 (master communication device 34 and the slave communication device 35) accept the input of the distance measurement request, the communication devices 31 start communication with the terminal 2 to measure distances.

Next, the communication for distance measurement will be described. Note that, this example mainly assumes that UWB radio waves are used as radio waves (ranging radio wave and response radio wave) for the communication for distance measurement. Therefore, hereinafter, the radio wave used for the communication for distance measurement may also be referred to as a "UWB radio wave Sa". However, the radio wave used for the communication for distance measurement is not limited to the UWB radio wave.

First, with regard to the communication for distance measurement, the communication devices 31 (that is, the master communication device 34 and the slave communication device 35) transmit the UWB radio waves Sa. When the UWB transmission/reception section 33 of the terminal 2 receives a UWB radio wave Sa from the communication device 31, the UWB transmission/reception section 33 returns a UWB radio wave Sa as a response. Next, the communication device 31 receives the UWB radio wave Sa transmitted from the terminal 2. At this time, the measurement section 45 of the communication device 31 (that is, the measurement section 45b of the master communication device 34 and the measurement section 45a of the slave communication device 35) measures a measurement value Vm corresponding to a distance between the communication device 31 and the terminal 2 (measurement value representing the distance).

More specifically, the measurement section 45 of the communication device 31 calculates propagation time from transmission of a UWB radio wave Sa to reception of a UWB radio wave Sa, which is a response to the transmitted UWB radio wave Sa, and the measurement section 45 of the communication device 31 computes the measurement value Vm corresponding to the distance between the communication device 31 and the terminal 2 (measurement value representing the distance) from the propagation time. In addition, the measurement section 45 determines whether or not the measurement value Vm is valid. To determine whether or not the measurement value Vm is valid, it is determined whether or not the measurement value Vm is less than a prescribed value Vk, for example.

(Update of Encryption Key)

As described above, the communication device 31 communicates with the terminal 2 to measure the distance (first communication). Next, the communication device 31 obtains the measurement value Vm as a result of the communication for distance measurement. The communication device 31 obtains a determination result indicating whether or not the measurement value Vm is valid. The communication device 31 transmits the determination result to the verification ECU 8 through communication via a communication line (second communication). For example, the slave communication device 35 transmits the determination result to the verification ECU 8 via the communication line 37, the master communication device 34, and the communication line 36. In addition, the master communication device 34 transmits the determination result to the verification ECU 8 via the communication line 36. Note that, a communication partner with the communication device 31 in the communication for distance measurement is different from a communication partner with the communication device 31 in communication via the communication line.

The verification ECU 8 receives the determination result from the communication device 31 through the communication via the communication line. The verification ECU 8 validates or invalidates a verification result of the smart verification depending on the determination result.

At this time, the communication device 31 does not transmit the determination result to the verification ECU 8 without any change. It is assumed that the communication device 31 generates communication data by processing the determination result and then transmit the communication data to the verification ECU 8. In such a case, it takes time to complete transmission of the communication data if the communication data is generated after the communication device 31 derives the result. Therefore, in the present embodiment, the communication device 31 reduces an amount of time from when communication with the terminal 2 is completed to when communication data corresponding to a communication result is output to the verification ECU 8.

Note that, the terminal 2 is an example of the external device that communicates with the communication device 31 (first communication). The communication for distance measurement is an example of communication (first communication) between the communication device 31 and the external device. The measurement value Vm is an example of a result of the communication (first communication) between the communication device 31 and the external device. Therefore, the external device that communicates with the communication device 31 (first communication) is not limited to the terminal 2. The communication (first communication) between the communication device 31 and the external device is not limited to the communication for distance measurement. The result of the communication (first communication) between the communication device 31 and the external device is not limited to the measurement value Vm.

In addition, the determination result indicating whether or not the measurement value Vm is valid is an example of communication data corresponding to the result of the communication (first communication) between the communication device 31 and the external device. Therefore, the communication data corresponding to the result of the communication (first communication) between the communication device 31 and the external device is not limited to the determination result indicating whether or not the measurement value Vm is valid. For example, the communication data corresponding to the result of the communication (first communication) between the communication device 31 and the external device may be some kind of determination result based on the communication (first communication) between the communication device 31 and the external device (for example, the normality determination result, the abnormality determination result, or the like).

The verification ECU 8 is an example of the control device that communicates with the communication device 31 via the communication line (second communication). The communication via the communication line is an example of communication (second communication) between the communication device 31 and the control device. Therefore, the control device that communicates with the communication device 31 via the communication line (second communication) is not limited to the verification ECU 8, and the communication (second communication) between the communication device 31 and the control device is not limited to the communication via the com] line. In addition, this example assumes that encryption using an encryption key as an example of the process performed on the determination result. However, the process performed on the determination result is not limited to the encryption using the encryption key.

In the case where a predetermined condition (hereinafter, also referred to as a "solution generation condition") is satisfied, the update control section 47 of the verification ECU 8 generates a random number α and a random number β, outputs the random number β to the update section 44c of the verification ECU 8, and transmits the random number α and the random number β to the master communication device 34 via the communication line 36. This makes it possible to generate the random numbers for the first time in the case where the key generation condition is satisfied. The random numbers are updated in the case where the key generation condition is satisfied for the second or subsequent times. When the random number α and the random number β are received from the verification ECU 8 via the communication line 36, the interface section 39 of the master communication device 34 outputs the random number α and the random number β to the update section 44b and transmits the random number α to the slave communication device 35 via the communication line 37.

The update section 44a of the slave communication device 35 generates a first encryption selection solution on the basis of the random number α and the first encryption key when the random number α is received from the master communication device 34 via the communication line 37. More specifically, the update section 44a of the slave communication device 35 generates the first encryption selection solution by encrypting the random number α using the first encryption key. Here, the random number α may correspond to a first selection solution. Next, in the case where the first encryption selection solution is generated for the first time, the update section 44a stores the generated first encryption selection solution in the volatile memory 40a. On the other hand, in the case where the first encryption selection solution is generated for the second or subsequent time, the update section 44a updates the first encryption selection solution stored in the volatile memory 40a by using the generated first encryption selection solution. Such a configuration makes it possible to improve security of the first encryption selection solution.

FIG. 1 illustrates the first encryption selection solution stored in the volatile memory 40a of the slave communication device 35. Here, the number of first encryption selection solutions is not limited, but the number of first encryption selection solutions stored in the volatile memory 40a corresponds to at least the number of types of determination results. In this example, the number of types of determination results is two. Therefore, the volatile memory 40a stores the two first encryption selection solutions. In other words, the update section 44a causes the volatile memory 40a to store a first encryption selection solution corresponding to a determination result indicating that a measurement value Vm is valid, and a first encryption selection solution corresponding to a determination result indicating that a measurement value Vm is invalid. The number of types of determination results is one, three, or more.

When the random number α is input from the interface section 39, the update section 44b of the master communication device 34 generates a first encryption verification solution on the basis of the random number α and the first encryption key. More specifically, the update section 44b of the master communication device 34 generates the first encryption verification solution by encrypting the random number α using the first encryption key. Here, the random number α may correspond to a first verification solution. Next, in the case where the first encryption verification solution is generated for the first time, the update section 44a stores the generated first encryption verification solution in the volatile memory 40b. On the other hand, in the case where the first encryption verification solution is generated for the second or subsequent time, the update section 44b updates the first encryption verification solution stored in the volatile memory 40b by using the generated first encryption verification solution. Such a configuration makes it possible to improve security of the first encryption verification solution.

FIG. 1 illustrates the first encryption verification solution stored in the volatile memory 40b of the master communication device 34. Here, the number of first encryption verification solutions is not limited, but the number of first encryption verification solutions stored in the volatile memory 40b corresponds to at least the number of types of determination results. In this example, the number of types of determination results is two. Therefore, the volatile memory 40b stores the two first encryption verification solutions. In other words, the update section 44b causes the volatile memory 40b to store a first encryption verification solution corresponding to the determination result indicating that a measurement value Vm is valid, and a first encryption verification solution corresponding to the determination result indicating that a measurement value Vm is invalid.

When the random number β is input from the interface section 39, the update section 44b of the master communication device 34 generates a second encryption selection solution on the basis of the random number β and the second encryption key. More specifically, the update section 44b of the master communication device 34 generates the second encryption selection solution by encrypting the random number β using the second encryption key. Here, the random number β may correspond to a second selection solution. Next, in the case where the second encryption selection solution is generated for the first time, the update section 44b stores the generated second encryption selection solution in the volatile memory 40b. On the other hand, in the case where the second encryption selection solution is generated for the second or subsequent time, the update section 44b updates the second encryption selection solution stored in the volatile memory 40b by using the generated second encryption selection solution. Such a configuration makes it possible to improve security of the second encryption selection solution.

FIG. 1 illustrates the second encryption selection solution stored in the volatile memory 40b of the master communication device 34. Here, the number of second encryption selection solutions is not limited, but the number of second encryption selection solutions stored in the volatile memory 40b corresponds to at least the number of types of determination results. In this example, the number of types of determination results is two. Therefore, the volatile memory 40b stores the two second encryption selection solutions. In other words, the update section 44b causes the volatile memory 40b to store a second encryption selection solution corresponding to the determination result indicating that a measurement value Vm is valid, and a second encryption selection solution corresponding to the determination result indicating that a measurement value Vm is invalid.

When the random number β is input from the update control section 47, the update section 44c of the verification ECU 8 generates a second encryption selection solution on the basis of the random number β and the second encryption key. More specifically, the update section 44c of the verification ECU 8 generates the second encryption selection solution by encrypting the random number β using the second encryption key. Here, the random number β may correspond to a second verification solution. Next, in the case where the second encryption verification solution is generated for the first time, the update section 44c stores the generated second encryption verification solution in the volatile memory 15. On the other hand, in the case where the second encryption verification solution is generated for the second or subsequent time, the update section 44c updates the second encryption verification solution stored in the volatile memory 15 by using the generated second encryption verification solution. Such a configuration makes it possible to improve security of the second encryption verification solution.

FIG. 1 illustrates the second encryption verification solution stored in the volatile memory 15 of the verification ECU 8. Here, the number of first encryption selection solutions is not limited, but the number of second encryption verification solutions stored in the volatile memory 15 corresponds to at least the number of types of determination results. In this example, the number of types of determination results is two. Therefore, the volatile memory 15 stores the two second encryption verification solutions. In other words, the update section 44c causes the volatile memory 15 to store a second encryption verification solution corresponding to the determination result indicating that a measurement value Vm is valid, and a second encryption verification solution corresponding to the determination result indicating that a measurement value Vm is invalid.

Note that, in a way similar to a timing of outputting the distance measurement request from the verification ECU 8, the solution generation condition may be a condition that smart communication has is established) for example, a condition that the vehicle 1 receives the ACK signal from the terminal 2 in response to the wake signal transmitted from the vehicle 1), or a condition that the outdoor smart verification or the indoor smart verification has succeeded. In other words, the solution generation condition may be a condition that communication for authentication of the terminal 2 is established or a condition that a portion of the authentication of the terminal 2 has succeeded.

Such a configuration makes it possible to improve security of the encryption selection solution by updating the encryption selection solution each time the terminal 2 is authenticated. In particular, it is assumed that, when authenticating the terminal 2, the communication for distance measurement is performed, it is determined whether or not a measurement value Vm is valid, and an encryption selection solution corresponding to a determination result is transmitted to the verification ECU 8. In such a case, the encryption selection solution is updated each time the encryption selection solution is transmitted to the verification ECU 8 if the encryption selection solution is updated each time the terminal 2 is authenticated. Therefore, this makes it possible to improve security of the encryption selection solution.

This example mainly focuses on a case where the solution generation condition is a condition that the communication for authentication of the terminal 2 is established, and a case where the random number α and the random number β are attached to the distance measurement request output from the verification ECU 8 to the master communication device 34. However, the random number α and the random number β do not have to be attached to the distance measurement request. The verification ECU 8 may output the distance measurement request, the random number α, and the random number β separately to the master communication device 34.

The solution generation condition is not limited to the above-described examples. For example, the solution generation condition may include a condition that a predetermined time has elapsed. According to this configuration, the same encryption key is not used after the predetermined time has elapsed. Therefore, it is expected to improve security of the encryption selection solution. The predetermined time may be time that comes only once or time that comes twice or more. In addition, the time that comes twice or more may be time that comes twice or more periodically.

Alternatively, the solution generation condition may include a condition that the number of communication (encrypted communication) performed between the terminal 2 and the communication device 31 by using the common encryption key reaches a predetermined number of times. According to this configuration, the same encryption key is not used after the number of encrypted communication reaches the predetermined number of times. Therefore, it is expected to improve security of the encryption selection solution. Note that, for example, it is sufficient that each of the terminal 2 and the communication device 31 notifies the verification ECU 8 of the number of encrypted communication performed between the terminal 2 and the communication device 31, and the verification ECU 8 manages the number of encrypted communication.

In addition, this example assumes that the update control section 47 generates the random numbers. However, data generated by the update control section 47 is not limited to the random numbers. For example, the data generated by the update control section 47 may be data that changes periodically. In other words, it is sufficient for the data generated by the update control section 47 to be information that may change over time. The data generated by the update control section 47 is preferably information that changes each time the information is output. In addition, to improve security, this example mainly assumes that the random number α and the random number β are values different from each other. However, the random number α and the random number β may be a same value.

As described above, the first encryption selection solution and the first encryption verification solution are generated on the basis of encryption using the first encryption key and a common key cryptosystem. Such a configuration makes it possible to improve confidentiality of communication. In addition, the generated first encryption selection solution and the generated first encryption verification solution becomes a same value if the first selection solution and the first verification solution are a same value (in the above example, both the first selection solution and the first verification solution are the random number α). The first selection solution and the first verification solution are targets of encryption using the first encryption key. Such a configuration makes it possible to easily check the first encryption selection solution against the first encryption verification solution on the basis of whether or not they are identical to each other. However, the generated first encryption selection solution and the generated first encryption verification solution do not have to be the same value. It is possible to check the first encryption selection solution against the first encryption verification solution on the basis of a correspondence relation between the first encryption selection solution and the first encryption verification solution as long as this correspondence solution is recognized.

In a similar way, the second encryption selection solution and the second encryption verification solution are generated on the basis of encryption using the second encryption key and the common key crypto system. Such a configuration makes it possible to improve confidentiality of communication. In addition, in addition, the generated second encryption selection solution and the generated second encryption verification solution becomes a same value if the second selection solution and the second verification solution are a same value (in the above example, both the second selection solution and the second verification solution are the random number β). The second selection solution and the second verification solution are targets of encryption using the second encryption key. Such a configuration makes it possible to easily check the second encryption selection solution against the second encryption verification solution on the basis of whether or not they are identical to each other. However, the generated second encryption selection solution and the generated second encryption verification solution do not have to be the same value. It is possible to check the second encryption selection solution against the second encryption verification solution on the basis of a correspondence relation between the second encryption selection solution and the second encryption verification solution as long as this correspondence solution is recognized.

(Notification of Determination Result)

The communication device 31 transmits, to the verification ECU 8, the encryption selection solution selected depending on a determination result indicating whether or not the measurement value Vm is valid. Next, the verification ECU 8 receives the encryption selection solution transmitted from the communication device 31. According to such a configuration, the encryption selection solution corresponding to the determination result is prepared before the communication for distance measurement between the communication device 31 and the terminal 2 is completed. Therefore, such a configuration makes it possible to reduce an amount of time from when the communication for distance measurement is completed to when the encryption selection solution corresponding to the determination result is output to the verification ECU 8.

The verification section 46 of the verification ECU 8 checks the received encryption selection solution against the encryption verification solution prepared depending on the encryption selection solution. According to such a configuration, the encryption verification solution corresponding to the received encryption selection solution is prepared in advance. Therefore, such a configuration makes it possible to reduce an amount of time from when the encryption selection solution is received to when the encryption verification solution compatible with the encryption selection solution is obtained and the determination result corresponding to the encryption verification solution is obtained.

In this example, both the slave communication device 35 and the master communication device 34 transmit the determination results, each of which indicates whether or not a measurement value Vm are valid.

First, the acquisition section 42a of the slave communication device 35 acquires the first encryption selection solution corresponding to the determination result obtained by the measurement section 45a, from the volatile memory 40a. The first communication section 43a transmits the first encryption selection solution acquired by the acquisition section 42a, to the master communication device 34 via the communication line 37. According to such a configuration, the first encryption selection solution corresponding to the determination result is prepared in advance. This makes it possible to reduce an amount of time from when the determination result is obtained to when the first encryption selection solution corresponding to the determination result is transmitted.

More specifically, in the case where the measurement section 45a has obtained the determination result indicating that the measurement value Vm is valid, the acquisition section 42a acquires the first encryption selection solution corresponding to the determination result indicating that the measurement value Vm is valid from the volatile memory 40a, and the first communication section 43a transmits the first encryption selection solution corresponding to the determination result indicating that the measurement value Vm is valid to the master communication device 34 via the communication line 37. According to such a configuration, the verification ECU 8 obtains the determination result indicating that the measurement value Vm is valid, as will be described later.

On the other hand, in the case where the measurement section 45a has obtained the determination result indicating that the measurement value Vm is invalid, the acquisition section 42a acquires the first encryption selection solution corresponding to the determination result indicating that the measurement value Vm is invalid from the volatile memory 40a, and the first communication section 43a transmits the first encryption selection solution corresponding to the determination result indicating that the measurement value Vm is invalid to the master communication device 34 via the communication line 37. According to such a configuration, the verification ECU 8 obtains the determination result indicating that the measurement value Vm is invalid, as will be described later.

When the second communication section 43b has received the first encryption selection solution from the slave communication device 35 via the communication line 377, the acquisition section 42b of the master communication device 34 checks the first encryption selection solution received by the second communication section 43b against the first encryption verification solution stored in the volatile memory 40b. According to such a configuration, the first encryption verification solution is prepared in advance. This makes it possible to reduce an amount of time from when the first encryption selection solution is received to when the first encryption selection solution corresponding to the first encryption verification solution is obtained.

In the case where the acquisition section 42b has acquired the first encryption verification solution compatible with the first encryption selection solution from the volatile memory 40b, the acquisition section 42b transmits the second encryption selection solution corresponding to the first encryption verification solution acquired by the acquisition section 42b to the verification ECU 8 via the communication line 36. According to such a configuration, the second encryption selection solution corresponding to the first encryption verification solution is prepared in advance. This makes it possible to reduce an amount of time from when the first encryption verification solution is received to when the second encryption selection solution corresponding to the first encryption verification solution is transmitted.

More specifically, in the case where the acquisition section 42b has acquired the first encryption verification solution corresponding to the determination result indicating that the measurement value Vm is valid from the volatile memory 40b as the first encryption verification solution compatible with the first encryption selection solution, the second communication section 43b transmits the second encryption selection solution corresponding to the determination result indicating that the measurement value Vm is valid to the verification ECU 8 via the communication line 36. According to such a configuration, the verification ECU 8 obtains the determination result indicating that the measurement value Vm is valid, as will be described later.

On the other hand, in the case where the acquisition section 42b has acquired the first encryption verification solution corresponding to the determination result indicating that the measurement value Vm is invalid from the volatile memory 40b as the first encryption verification solution compatible with the first encryption selection solution, the second communication section 43b transmits the second encryption selection solution corresponding to the determination result indicating that the measurement value Vm is invalid to the verification ECU 8 via the communication line 36. According to such a configuration, the verification ECU 8 obtains the determination result indicating that the measurement value Vm is invalid, as will be described later.

Note that, it is also assumed that the acquisition section 42b does not acquire, from the verification memory 40b, the first encryption verification solution compatible with the first encryption selection solution received by the second communication section 43b. In such a case, the second communication section 43b may transmit noting to the verification ECU 8 via the communication line 36. Alternatively, the communication section 43b may transmit information indicating that no first encryption verification solution is acquired, to the verification ECU 8 via the communication line 36. Therefore, as long as the reception section 49 of the verification ECU 8 has received the information indicating that no first encryption verification solution is acquired, it is possible for the verification section 46 of the verification ECU 8 to recognize occurrence of a situation where no second encryption verification solution is received from the master communication device 34 because the master communication device 34 has not acquired the first encryption verification solution, even if such a situation has occurred.

In addition, the acquisition section 42b of the master communication device 34 acquires the second encryption selection solution corresponding to the determination result obtained by the measurement section 45b, from the volatile memory 40b. The second communication section 43b transmits the second encryption selection solution acquired by the acquisition section 42b, to the verification ECU 8 via the communication line 36. According to such a configuration, the second encryption selection solution corresponding to the determination result is prepared in advance. This makes it possible to reduce an amount of time from when the determination result is obtained to when the second encryption selection solution corresponding to the determination result is transmitted.

More specifically, in the case where the measurement section 45b has obtained the determination result indicating that the measurement value Vm is valid, the acquisition section 42b acquires the second encryption selection solution corresponding to the determination result indicating that the measurement value Vm is valid from the volatile memory 40b, and the second communication section 43b transmits the second encryption selection solution corresponding to the determination result indicating that the measurement value Vm is valid to the verification ECU 8 via the communication line 36. According to such a configuration, the verification ECU 8 obtains the determination result indicating that the measurement value Vm is valid, as will be described later.

On the other hand, in the case where the measurement section 45b has obtained the determination result indicating that the measurement value Vm is invalid, the acquisition section 42b acquires the second encryption selection solution corresponding to the determination result indicating that the measurement value Vm is invalid from the volatile memory 40b, and the second communication section 43b transmits the second encryption selection solution corresponding to the determination result indicating that the measurement value Vm is invalid to the verification ECU 8 via the communication line 36. According to such a configuration, the verification ECU 8 obtains the determination result indicating that the measurement value Vm is invalid, as will be described later.

In the case where the reception section 49 has received the second encryption selection solution from the master communication device 34 via the communication line 36, the verification section 46 of the verification ECU 8 checks the second encryption selection solution received by the reception section 49 against the second encryption verification solution stored in the volatile memory 15. According to such a configuration, the second encryption verification solution corresponding to the second encryption selection solution received by the reception section 49 is prepared in advance. Therefore, such a configuration makes it possible to reduce an amount of time from when the second encryption selection solution is received by the reception section 49 to when the second encryption verification solution compatible with the second encryption selection solution is obtained and the determination result corresponding to the second encryption verification solution is obtained.

In the case where the verification section 46 has acquired the second encryption verification solution compatible with the second encryption selection solution from the volatile memory 15, the process execution section 17 obtains the determination result corresponding to the acquired second encryption verification solution. More specifically, in the case where the verification section 46 has acquired the second encryption verification solution corresponding to the determination result indicating that the measurement value Vm is valid from the volatile memory 15 as the second encryption verification solution compatible with the second encryption selection solution, the process execution section 17 obtains the determination result indicating that the measurement value Vm is valid. On the other hand, in the case where the verification section 46 has acquired the second encryption verification solution corresponding to the determination result indicating that the measurement value Vm is invalid from the volatile memory 15 as the second encryption verification solution compatible with the second encryption selection solution, the process execution section 17 obtains the determination result indicating that the measurement value Vm is invalid.

Note that, it is also assumed that the verification section 46 does not acquire the second encryption verification solution compatible with the second encryption selection solution from the volatile memory 15. In such a case, it is sufficient for the process execution section 17 to obtain the determination result indicating that the measurement value Vm is invalid (it is sufficient to determine that the measurement value Vm is invalid).

The process execution section 17 decides whether or not the smart verification has succeeded on the basis of the determination result indicating whether or not the measurement value Vm is valid. For example, the process execution section 17 enables the successful smart verification in the case where at least one of the communication devices 31 has input the determination result indicating that the measurement value Vm is valid. On the other hand, the process execution section 17 disables the successful smart verification in the case where no communication device 31 has input the determination result indicating that the measurement value Vm is valid. The verification ECU 8 permits actuation of the in-vehicle device 3 or actuates the in-vehicle device 3 in the case where the successful smart verification is enabled.

1.2. Operation Example

Next, with reference to FIG. 3 and FIG. 4, action of the distance measurement system 30 according to the present embodiment will be described.

Figure 3:
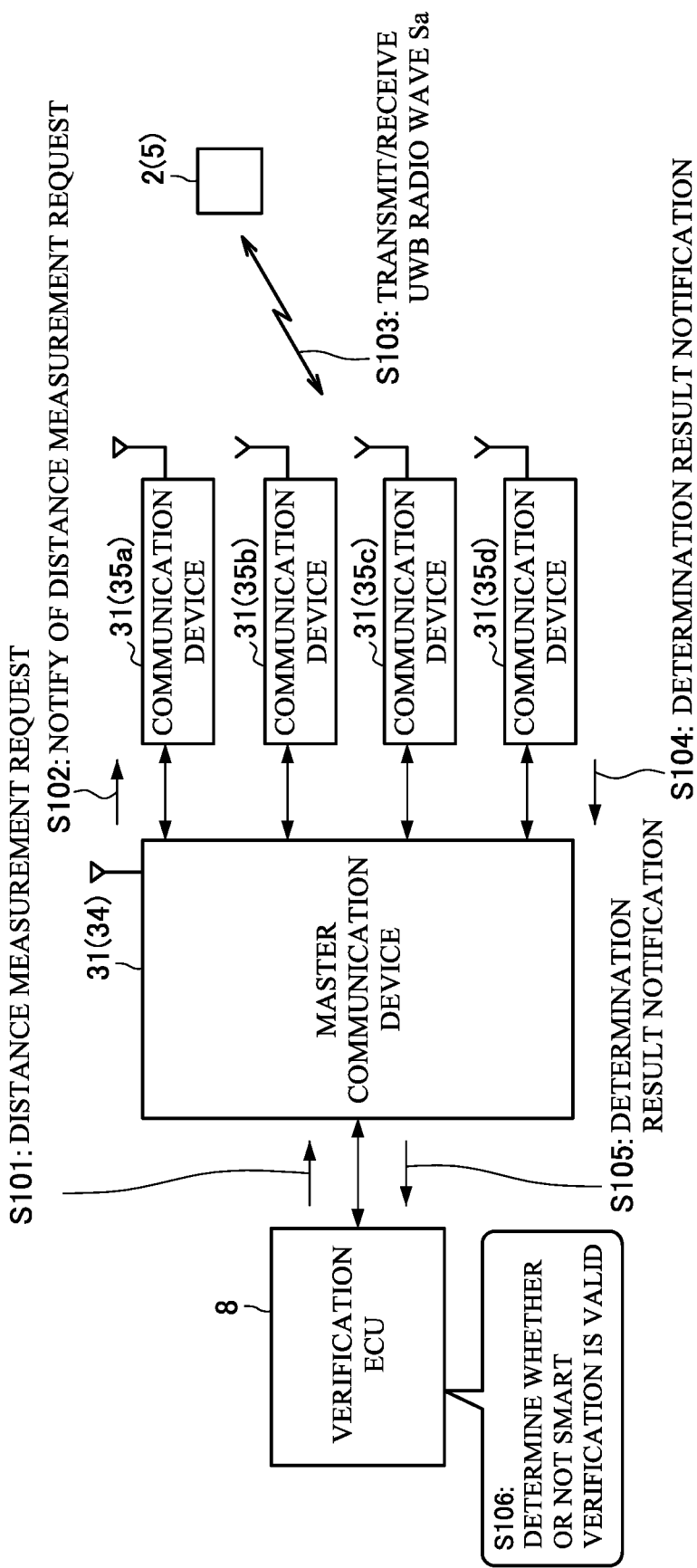
FIG. 3 is an explanatory diagram illustrating a procedure of distance measurement.
Figure 4:
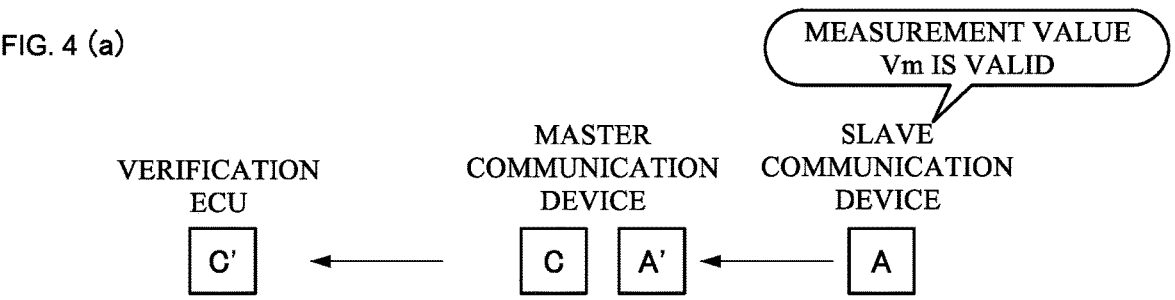
FIG. 4(a) is an explanatory diagram illustrating transmission of an encryption selection solution performed in the case where a measurement value is valid.
FIG. 4(b) is an explanatory diagram illustrating transmission of an encryption selection solution performed in the case where a measurement value is invalid.
FIG. 4(c) is an explanatory diagram illustrating an example of notification to a verification ECU performed in the case where the first encryption selection solution is not identical to a first encryption verification solution.
Figure 4:
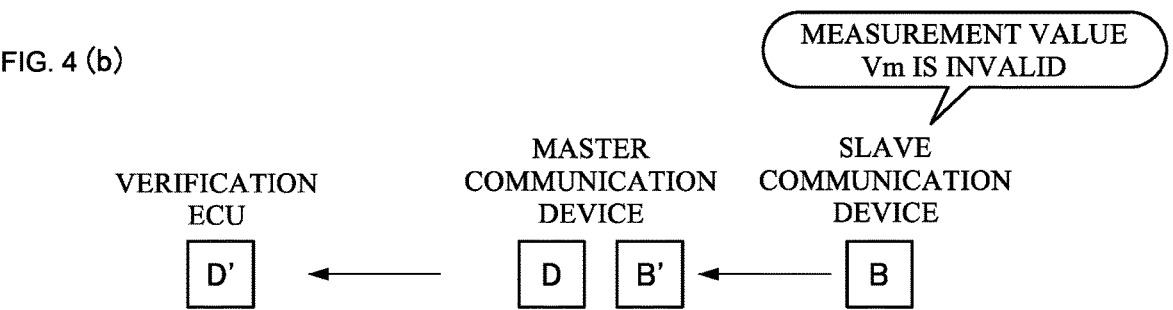
Figure 4:
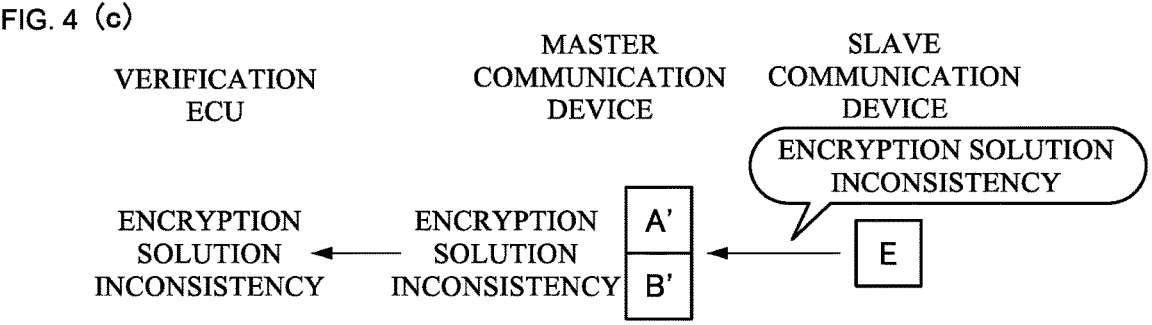

As illustrated in FIG. 3, the verification ECU 8 transmits the distance measurement request to the master communication device 34 in Step S101. In addition, the update control section 47 generates the random numbers α and β, and transmits the distance measurement request and the random numbers α and β to the master communication device 34. At this time, the update section 44c updates the second encryption verification solution by using the random number β and the second encryption key. As described above, the distance measurement request and the random numbers α and β may be transmitted when the smart communication is established (for example, when the vehicle 1 receives the ACK signal from the terminal 2 in response to the wake signal transmitted from the vehicle 1), or when the outdoor smart verification or the indoor smart verification has succeeded. The establishment of the smart communication means that the vehicle 1 receives the ACK signal from the terminal 2 in response to the wake signal transmitted from the vehicle 1, for example. In addition, as described above, the distance measurement request, the random number α, and the random number β may be transmitted at different timings.

When the interface section 39 of the master communication device 34 has received the distance measurement request and the random numbers α and β in Step S102, the update section 44b of the master communication device 34 updates the first encryption verification solution by using the random number α and the first encryption key, and updates the second encryption selection solution by using the random number β and the second encryption key. In addition, the communication control section 38 of the master communication device 34 sets an order of actuation of the slave communication devices 35a to 35d, and notifies the slave communication devices 35a to 35d of the distance measurement request and the random number α while following the order of actuation. As described above, it is possible to differentiate timings of actuating the slave communication devices 35a to 35d by differentiating timings of notifying the slave communication devices 35a to 35d of the distance measurement request.

When the distance measurement request and the notification of the random number α are received, the respective update sections 44a of the slave communication devices 35a to 35d update the first encryption selection solutions by using the random number α and the first encryption key. This makes it possible to update the first encryption selection solution, the first encryption verification solution, the second encryption selection solution, and the second encryption verification solution to unique values that are only valid in this communication.

In this example, a common encryption key serves as the first encryption key used by the master communication device 34 and the first encryption key used by the slave communication device 35. In other words, the first encryption selection solution and the first encryption verification solution are encrypted by using the common key cryptosystem. In addition, the first encryption selection solution becomes a same value as the first encryption verification solution in the case where data serving as a source of the first encryption selection solution (that is, the first selection solution) is a same value as data serving as a source of the first encryption verification solution (that is, the first verification solution).

In a similar way, in this example, a common encryption key serves as the second encryption key used by the master communication device 34 and the first encryption key used by the verification ECU 8. In other words, the second encryption selection solution and the second encryption verification solution are encrypted by using the common key cryptosystem. In addition, the second encryption selection solution becomes a same value as the second encryption verification solution in the case where data serving as a source of the second encryption selection solution (that is, the second selection solution) is a same value as data serving as a source of the second encryption verification solution (that is, the second verification solution).

When each of the slave communication devices 35a to 35d has received the distance measurement request and the notification of the random number α (that is, when a timing of actuating each of the slave communication devices 35a to 35d has come), each of the slave communication devices 35a to 35d receives a UWB radio wave Sa from the terminal 2 and transmits a UWB radio wave Sa to the terminal 2 in response to the received UWB radio wave Sa in Step S103. When the UWB transmission/reception section 33 of the terminal 2 has received the response from each of the slave communication devices 35a to 35d, the UWB transmission/reception section 33 further transmits a UWB radio wave Sa. The measurement section 45a of each of the slave communication devices 35a to 35d measures time from when a UWB radio wave Sa is transmitted as the response to when a UWB radio wave Sa is received again. Next, the measurement section 45a of each of the slave communication devices 35a to 35d calculates the measurement value Vm corresponding to a distance between the terminal 2 and each of the slave communication devices 35a to 35d, from the measured time.

The measurement section 45a of each of the slave communication devices 35a to 35d determines validity of the calculated measurement value Vm. The measurement section 45a of each of the slave communication devices 35a to 35d determines that the distance between the vehicle 1 and the terminal 2 is valid in the case where the measurement value Vm is less than the prescribed value Vk. On the other hand, the measurement section 45a of each of the slave communication devices 35a to 35d determines that the distance between the vehicle 1 and the terminal 2 is invalid in the case where the measurement value Vm is the prescribed value Vk or more.

On the other hand, when a timing of actuating the master communication device 34 comes, the master communication device 34 receives a UWB radio wave Sa from the terminal 2 and transmits a UWB radio wave Sa to the terminal 2 in response to the received UWB radio wave Sa without notifying of the distance measurement request. When the UWB transmission/reception section 33 of the terminal 2 has received the response from each of the master communication device 34, the UWB transmission/reception section 33 further transmits a UWB radio wave Sa. The measurement section 45b of the master communication device 34 measures time from when a UWB radio wave Sa is transmitted as a response to when a UWB radio wave Sa is received again. Next, the measurement section 45a of the master communication device 34 calculates the measurement value Vm corresponding to a distance between the terminal 2 and the master communication device 34, from the measured time.

The measurement section 45a of the master communication device 34 determines validity of the calculated measurement value Vm. The measurement section 45b of the master communication device 34 determines that the distance between the vehicle 1 and the terminal 2 is valid in the case where the measurement value Vm is less than the prescribed value Vk. On the other hand, the measurement section 45b of the master communication device 34 determines that the distance between the vehicle 1 and the terminal 2 is invalid in the case where the measurement value Vm is the prescribed value Vk or more.

In Step S104, the first communication section 43a of each of the slave communication devices 35a to 35d notifies the master communication device 34 of the first encryption selection solution corresponding to the determination result when the measurement section 45a has obtained the determination result indicating whether or not the measurement value Vm is valid.

In Step S105, the second communication section 43b of the master communication device 34 notifies the verification ECU 8 of the second encryption selection solution corresponding to the determination result of which each of the slave communication devices 35a to 35d has notified, when each of the slave communication devices 35a to 35d has notified the second communication section 43b of the determination result indicating whether or not the measurement value Vm is valid. In addition, the second communication section 43b of the master communication device 34 notifies the verification ECU 8 of the second encryption selection solution corresponding to the determination result obtained by the measurement section 45b, when the measurement section 45b has obtained the determination result indicating whether or not the measurement value Vm is valid.

Next, with reference to FIG. 4(a) and FIG. 4(b), ways of notifying of the determination result will be described.

As illustrated in FIG. 4(a), in the case where the measurement section 45a of the slave communication device 35 has determined that the measurement value Vm is valid, the acquisition section 42a of the slave communication device 35 acquires a first encryption selection solution A corresponding to the determination result indicating that the measurement value Vm is valid from the volatile memory 40a. The first communication section 43a transmits the first encryption selection solution A corresponding to the determination result indicating that the measurement value Vm is valid to the master communication device 34.

The volatile memory 40b of the master communication device 34 has stored a first encryption verification solution A' and a second encryption selection solution C, which correspond to the determination result indicating that the measurement value Vm is valid. The second communication section 43b transmits the second encryption selection solution C corresponding to the first encryption verification solution A' to the verification ECU 8 when the verification section 46 has confirmed that the first encryption verification solution A' registered on the volatile memory 40b is identical to the first encryption selection solution A corresponding to the determination result indicating that the measurement value Vm is valid. The first encryption selection solution A is input from the slave communication device 35.

The volatile memory 15 of the verification ECU 8 has stored a second encryption verification solution C' corresponding to the determination result indicating that the measurement value Vm is valid. The process execution section 17 obtains a determination result corresponding to the second encryption verification solution C', that is, the determination result indicating that the measurement value Vm is valid, when the verification section 46 has confirmed that the second encryption verification solution C' registered on the volatile memory 15 is identical to the second encryption selection solution C corresponding to the determination result indicating that the measurement value Vm is valid. The second encryption selection solution C is input from the master communication device 34.

Note that, in a similar way, in the case where the measurement section 45b of the master communication device 34 has determined that the measurement value Vm is valid, the acquisition section 42b of the master communication device 34 acquires a second encryption selection solution C corresponding to the determination result indicating that the measurement value Vm is valid from the volatile memory 40b. Next, the second communication section 43b transmits the second encryption selection solution C to the verification ECu 8. This allows the verification ECU 8 to recognize the determination result indicating that the measurement value Vm is valid.

As illustrated in FIG. 4(b), in the case where the measurement section 45a of the slave communication device 35 has determined that the measurement value Vm is invalid, the acquisition section 42a of the slave communication device 35 acquires a first encryption selection solution B corresponding to the determination result indicating that the measurement value Vm is invalid from the volatile memory 40a. The first communication section 43a transmits the first encryption selection solution B corresponding to the determination result indicating that the measurement value Vm is invalid to the master communication device 34.

The volatile memory 40b of the master communication device 34 has stored a first encryption verification solution B' and a second encryption selection solution D, which correspond to the determination result indicating that the measurement value Vm is invalid. The second communication section 43b transmits the second encryption selection solution D corresponding to the first encryption verification solution B' to the verification ECU 8 when the verification section 46 has confirmed that the first encryption verification solution B' registered on the volatile memory 40b is identical to the first encryption selection solution B corresponding to the determination result indicating that the measurement value Vm is invalid. The first encryption selection solution B is input from the slave communication device 35.

The volatile memory 15 of the verification ECU 8 has stored a second encryption verification solution D' corresponding to the determination result indicating that the measurement value Vm is valid. The process execution section 17 obtains a determination result corresponding to the second encryption verification solution D', that is, the determination result indicating that the measurement value Vm is invalid, when the verification section 46 has confirmed that the second encryption verification solution D' registered on the volatile memory 15 is identical to the second encryption selection solution D corresponding to the determination result indicating that the measurement value Vm is invalid. The second encryption selection solution D is input from the master communication device 34.

Note that, in a similar way, in the case where the measurement section 45b of the master communication device 34 has determined that the measurement value Vm is invalid, the acquisition section 42b of the master communication device 34 acquires the second encryption selection solution D corresponding to the determination result indicating that the measurement value Vm is invalid from the volatile memory 40b. Next, the second communication section 43b transmits the second encryption selection solution D to the verification ECU 8. This allows the verification ECU 8 to recognize the determination result indicating that the measurement value Vm is invalid.

In addition, it is also assumed that the first encryption selection solution input from the slave communication device 35 to the acquisition section 42b of the master communication device 34 is not identical to any of the first encryption verification solutions A' and B' registered on the volatile memory 40b. In such a case, as described above, the second communication section 43b does not have to transmit any of the second encryption selection solutions C and D to the verification ECU 8, but the second communication section 43b preferably transmits information indicating that the acquisition section 42b acquires no first encryption verification solution to the verification ECU 8.

FIG. 4(c) illustrates a specific example. As illustrated in FIG. 4(c), it is also assumed that a first encryption selection solution E input from the slave communication device 35 to the acquisition section 42b of the master communication device 34 is not identical to any of the first encryption verification solutions A' and B' registered on the volatile memory 40b (such a situation is referred to as "encryption solution inconsistency" in FIG. 4(c)). In such a case, as described above, the second communication section 43b transmits the information indicating that the acquisition section 42b acquires no first encryption verification solution (such a situation is referred to as "encryption solution inconsistency" in FIG. 4(c)) to the verification ECU 8 as the determination result of the measurement value Vm made by the slave communication device 35.

This allows the verification ECU 8 to recognize that the first encryption verification solution corresponding to the result of determining the measurement value Vm by the slave communication device 35 is not acquired. Note that, as a reason why the first encryption verification solution corresponding to the result of determining the measurement value Vm by the slave communication device 35 is not acquired, it is assumed that fraudulent behavior is being performed on the slave communication device 35.

FIG. 5 is a table showing examples of correspondence relations among notifications to the verification ECU 8, results of determining measurement values Vm by the master communication device 34, and results of determining measurement values Vm by the slave communication device 35. In the example illustrated in FIG. 5, wording "valid" indicates that the measurement value Vm is valid, and wording "invalid" indicates that the measurement value Vm is invalid. Wording "encryption solution inconsistency" indicates that the second encryption selection solution or the first encryption verification solution corresponding to a result of determining a measurement value Vm by a communication device 31 is not acquired.

As illustrated in first to fourth rows in FIG. 5, the second communication section 43b of the master communication device 34 may notify the verification ECU 8 of second encryption selection solutions aggregated into one. In other words, it is assumed that at least any one of the determination result obtained by the measurement section 45b of the master communication device 34 and the determination results of which the respective slave communication devices 35a to 35d has notified indicates that the measurement value Vm is valid. In such a case, the second communication section 43b of the master communication device 34 may notify the verification ECU 8 of the second encryption selection solution C corresponding to the determination result indicating that the measurement value Vm is valid.

Therefore, in the case where the determination result indicating that the measurement value Vm is valid is obtained from the measurement section 45b of the master communication device 34, the second communication section 43b of the master communication device 34 may notify the verification ECU 8 of the second encryption selection solution C corresponding to the determination result indicating that the measurement value Vm is valid, without waiting for acquisition of the determination results of which the respective slave communication devices 35a to 35d has notified.

On the other hand, it is assumed that all the determination result obtained by the measurement section 45b of the master communication device 34 and the determination results of which the respective slave communication devices 35a to 35d has notified indicate that the measurement value Vm is invalid. In such a case, the second communication section 43b of the master communication device 34 may notify the verification ECU 8 of the second encryption selection solution D corresponding to the determination result indicating that the measurement value Vm is invalid.

In addition, fifth to seventh rows in FIG. 5 illustrate examples in which the master communication device 34 notifies the verification ECU 8 of "encryption solution inconsistency" in addition to the second encryption selection solution.

For example, it is assumed that at least any one of the determination result obtained by the measurement section 45b of the master communication device 34 and the determination results of which the respective slave communication devices 35a to 35d has notified indicates that the measurement value Vm is valid, and the second encryption selection solution or the first encryption verification solution corresponding to at least one of the determination results is not acquired. In such a case, the second communication section 43b of the master communication device 34 may notify the verification ECU 8 of the "encryption solution inconsistency (in other words, information indicating that the first encryption verification solution or the second encryption selection solution is not acquired)" and the second encryption selection solution C corresponding to the determination result indicating that the measurement value Vm is valid (see fifth to sixth rows in FIG. 5).

For example, as illustrated in the fifth row in FIG. 5, it is assumed that the second encryption selection solution or the first encryption verification solution corresponding to at least any one of the determination results of which the respective slave communication devices 35a to 35d has notified is not acquired, and the determination result obtained by the measurement section 45b of the master communication device 34 indicates that the measurement value Vm is valid. In such a case, the second communication section 43b of the master communication device 34 may notify the verification ECU 8 of the "encryption solution inconsistency (in other words, information indicating that the first encryption verification solution or the second encryption selection solution is not acquired)" and the second encryption selection solution C corresponding to the determination result indicating that the measurement value Vm is valid.

For example, as illustrated in the sixth row in FIG. 5, it is assumed that the determination results of which the respective slave communication devices 35a to 35d has notified indicates that the measurement value Vm is valid, and the second encryption selection solution corresponding to the determination result obtained by the measurement section 45b of the master communication device 34 is not acquired. In such a case, the second communication section 43b of the master communication device 34 may notify the verification ECU 8 of the "encryption solution inconsistency (in other words, information indicating that the first encryption verification solution or the second encryption selection solution is not acquired)" and the second encryption selection solution C corresponding to the determination result indicating that the measurement value Vm is valid.

For example, as illustrated in the seventh row in FIG. 5, it is assumed that the second encryption selection solution or the first encryption verification solution corresponding to all of the determination result obtained by the measurement section 45b of the master communication device 34 and the determination results of which the respective slave communication devices 35a to 35d has notified is not acquired In such a case, the second communication section 43b of the master communication device 34 may notify the verification ECU 8 of the "encryption solution inconsistency (in other words, information indicating that the first encryption verification solution or the second encryption selection solution is not acquired)" and the second encryption selection solution D corresponding to the determination result indicating that the measurement value Vm is invalid.

In addition, it is assumed that the communication for distance measurement cannot be performed between the terminal 2 and at least any of the master communication device 34 and the slave communication devices 35a to 35d because a communication error has occurred between the terminal 2 and the communication device. In such a case, the verification ECU 8 may be notified of information indicating that the communication error has occurred between the terminal 2 and the communication device 31.

Figure 6:
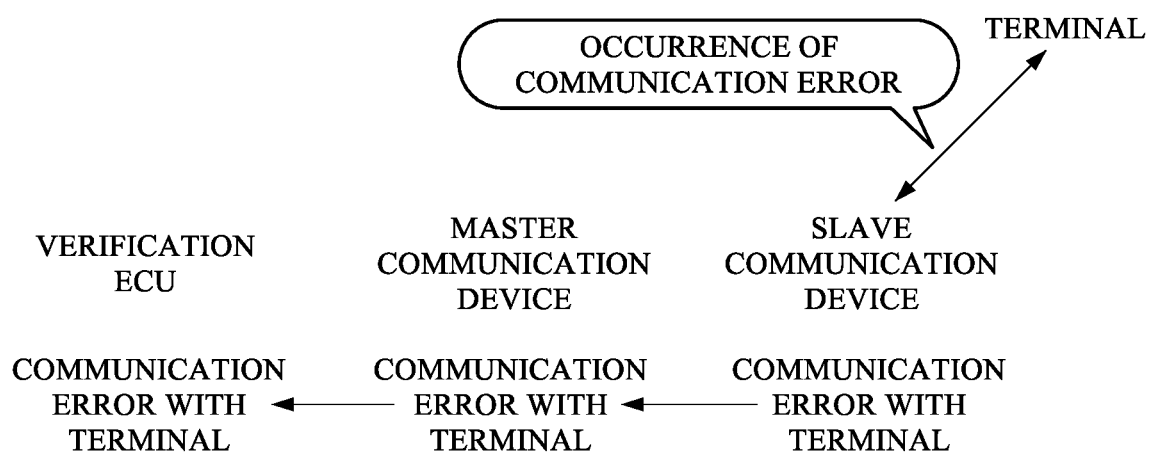
FIG. 6 is an explanatory diagram illustrating an example of a notification to the verification ECU made in the case where a communication error occurs between the slave communication device and a terminal.

FIG. 6 illustrates a specific example. As illustrated in FIG. 6, it is assumed that the communication error occurs between the terminal 2 and the slave communication device 35 and the communication for distance measurement cannot be performed between the terminal 2 and the slave communication device 35. In such a case, the first communication section 43a of the slave communication device 35 may transmit, to the master communication device 34, information indicating that the communication error has occurred between the terminal 2 and the slave communication device 35. In addition, the second communication section 34b of the master communication device 34 may transmit, to the verification ECU 8, the information indicating that the communication error has occurred between the terminal 2 and the slave communication device 35.

In a way similar to the example illustrated in FIG. 6, it is also assumed that the communication error occurs between the terminal 2 and the master communication device 34 and the communication for distance measurement cannot be performed between the terminal 2 and the master communication device 34. In such a case, the second communication section 34b of the master communication device 34 may transmit, to the verification ECU 8, information indicating that the communication error has occurred between the terminal 2 and the master communication device 34.

In addition, it is also assumed that the verification section 46 of the verification ECU 8 the second encryption selection solution input from the master communication device 34 is not identical to any of the second encryption verification solutions C' and D' registered on the volatile memory 15. In such a case, as described above, it is sufficient that the process execution section 17 recognizes that the measurement value Vm is invalid. As described above, a correct encryption selection solution is necessary for the verification ECU 8 to determine that a measurement value Vm is valid. Therefore, it is possible to improve security.

Referring again to FIG. 3, the process execution section 17 of the verification ECU 8 determines whether or not to enable the smart verification on the basis of a determination result in Step S106. For example, the process execution section 17 validates a verification result obtained through the smart verification if a determination result indicating that a measurement value Vm is valid is obtained from at least any of the second encryption selection solutions input from the respective communication devices 31. On the other hand, the process execution section 17 invalidates a verification result obtained through the smart verification if determination results indicating that measurement values Vm are invalid are obtained from the second encryption selection solutions input from all the communication devices 31.

Note that, as illustrated in the first to fourth rows in FIG. 5, it is also assumed that the master communication device 34 inputs the second encryption selection solutions aggregated into one to the verification ECU. In such a case, it is sufficient for the process execution section 17 of the verification ECU 8 to validate a verification result obtained through the smart verification if a determination result indicating that a measurement value Vm is valid is obtained from the second encryption selection solution input from the master communication device 34. On the other hand, it is sufficient for the process execution section 17 to invalidate a verification result obtained through the smart verification if a determination result indicating that a measurement value Vm is invalid is obtained from the second encryption selection solution input from the master communication device 34.

In addition, as illustrated in the fifth to seventh rows in FIG. 5, it is also assumed the master communication device 34 notifies the verification ECU 8 of the "encryption solution inconsistency" in addition to the second encryption selection solution. In such a case, the process execution section 17 of the verification ECU 8 may validate or invalidate (because of the encryption solution inconsistency) a verification result obtained through the smart verification in the case where a determination result indicating that a measurement value Vm is valid is obtained from the second encryption selection solution input from the master communication device 34. On the other hand, it is sufficient for the process execution section 17 to invalidate a verification result obtained through the smart verification in the case where a determination result indicating that a measurement value Vm is invalid is obtained from the second encryption selection solution input from the master communication device 34.

For example, the verification ECU 8 permits or causes the body ECU 9 to execute locking/unlocking actuation of the door lock device 6 in the case where the smart verification (outdoor smart verification) of an outdoor terminal 2 has succeeded and the process execution section 17 has validated the verification result of the smart verification. Therefore, for example, a vehicle door is unlocked when an exterior door handle is touched in a state where the door is locked. In addition, the vehicle door is locked when a lock button of the exterior door handle is pushed in a state where the door is unlocked.

On the other hand, the verification ECU 8 permits transition operation of a vehicle power supply via an indoor ignition switch 50 in the case where the smart verification (indoor smart verification) of the indoor terminal 2 has succeeded and the process execution section 17 has validated a verification result obtained through the smart verification. Therefore, the engine 7 starts when the ignition switch 50 is operated while a brake pedal is depressed.

Regardless of whether or not the smart verification has succeeded, the verification ECU 8 prohibits actuation of the in-vehicle device 3 in the case where the process execution section 17 invalidates the verification result obtained through the smart verification. For example, this makes it possible to prevent actuation of the in-vehicle device 3 through fraudulent communication using a relay or the like.

1.3. Effect

According to the above-described embodiment, there is provided the communication system including: the communication device configured to transmit a selection solution that is selected depending on a result of the first communication with the external device; and the control device configured to receive the selection solution from the communication device through the second communication between the communication device and a communication partner that is different from the external device serving as a communication partner in the first communication. According to such a configuration, the selection solution corresponding to the result of the first communication is prepared before the communication between the external device and the communication device is completed. Therefore, such a configuration makes it possible to reduce an amount of time from when the communication is completed to when the selection solution corresponding to the result of the first communication is output to the control device.

In addition, the control device may check the received selection solution against a verification solution prepared depending on the selection solution. According to such a configuration, the encryption verification solution corresponding to the received encryption selection solution is prepared in advance. Therefore, such a configuration makes it possible to reduce an amount of time from when the selection solution is received to when the verification solution compatible with the selection solution is obtained and the determination result corresponding to the verification solution is obtained.

The communication device may transmit the encryption selection solution obtained by encrypting the selection solution. The control device may receive the encryption selection solution, and may check the encryption selection solution against an encryption verification solution that is obtained by encrypting the verification solution. Such a configuration makes it possible to improve confidentiality of the determination result because the encryption selection solution and the encryption verification solution are used instead of the determination result itself. In addition, the encryption selection solution and the encryption verification solution may be generated on the basis of encryption using the common key crypto system. Such a configuration makes it possible to improve confidentiality of communication.

The communication system may include the update control section configured to update the selection solution and the verification solution in the case where the predetermined condition is satisfied. The communication device may update the encryption selection solution on the basis of the updated selection solution and the first encryption key. The control device may update the encryption verification solution on the basis of the updated verification solution and the second encryption key that is common to the first encryption key. Such a configuration makes it possible to improve confidentiality of the encryption selection solution and the encryption verification solution.

The communication device may include the first communication device and the second communication device. The first communication device may include the first communication section configured to transmit the first encryption selection solution to the second communication device in response to the result of the first communication with the external device. The second communication device may include the second communication section configured to transmit the second encryption selection solution corresponding to the first encryption verification solution to the control device in the case where the first encryption verification solution is acquired, the first encryption verification solution being compatible with the first encryption selection solution received from the first communication device. Such a configuration makes it possible to improve confidentiality of communication while suppressing increase in processing time, because the encryption selection key and the encryption verification solution are prepared in advance.

The second communication section may receive the first encryption selection solution corresponding to the normality determination result and may transmit the second encryption selection solution corresponding to the normality determination result to the control device in the case where the first encryption verification solution is acquired, the first encryption verification solution being compatible with the first encryption selection solution corresponding to the normality determination result. The second communication section may receive the first encryption selection solution corresponding to the abnormality determination result and may transmit the second encryption selection solution corresponding to the abnormality determination result to the control device in the case where the first encryption verification solution is acquired, the first encryption verification solution being compatible with the first encryption selection solution corresponding to the abnormality determination result. Such a configuration makes it possible to improve confidentiality of communication while suppressing increase in processing time, because the encryption selection key and the encryption verification solution are prepared in advance. It is possible to further improve the confidentiality of communication if the first encryption selection solution is different from the second encryption selection solution.

1.4. Modifications

Although details of the preferable embodiment of the present invention has been described above with reference to the appended drawings, the present invention is not limited thereto. It will be clear to a person of ordinary skill in the art of the present invention that various modifications and improvements may be obtained within the scope of the technical idea recited by the scope of the appended claims, and it should be understood that they will naturally come under the technical scope of the present invention.

For example, it is possible to modify the above embodiment as described below. The above-described embodiment and modifications listed below may be combined with each other to perform the present invention unless they are technologically contradictory to each other.

(Modification Related to Encryption Selection Solution and Encryption Verification Solution)

The above example has assumed that the second encryption selection solution is generated by using en encryption key that is different from the first encryption selection solution. However, the second selection solution may be obtained by encrypting the first encryption selection solution by using the common key cryptosystem. In other words, the master communication device 34 may generate the second encryption selection solution when an encryption process is performed on the first encryption selection solution received from the slave communication device 35 by using the common key cryptosystem. Such a configuration makes it possible to differentiate an encryption selection solution transmitted between the slave communication device 35 and the master communication device 34 from an encryption selection solution transmitted between the master communication device 34 and the verification ECU 8. This contributes to improvement in confidentiality.

The above example has assumed that the second encryption selection solution serves as data transmitted from the master communication device 34 and the verification ECU 8. However, the data transmitted from the master communication device 34 and the verification ECU 8 is not limited. For example, any data can be used as long as the data transmitted from the master communication device 34 and the verification ECU 8 is data transmitted depending on the first encryption selection solution. The above example has assumed that the encryption selection solution and the encryption verification solution are updated by using the encryption key and the random numbers α and β. However, the method of updating the encryption selection solution and the encryption verification solution is not limited. For example, the encryption selection solution and the encryption verification solution may be updated by encrypting the encryption selection solution and the encryption verification solution again using a predetermined arithmetic expression.

The above example has assumed that the random numbers α and β are transmitted together with the distance measurement request. However, timings of transmitting the random numbers α and ρ are not specifically limited. For example, the random numbers α and β may be transmitted before the distance measurement request.

The above example has assumed that the verification ECU 8 outputs the random numbers α and β. However, the random numbers α and β may be output from a block that is different from the verification ECU 8. For example, the random numbers α and β may be output from the master communication device 34 or the slave communication device 35. In other words, it is sufficient that the random numbers α and β is output from at least any one of the verification ECU 8, the master communication device 34, and the slave communication device 35, and is shared among the verification ECU 8, the master communication device 34, and the slave communication device 35.

The above example has assumed that the first encryption selection solution and the second encryption selection solution are generated on the basis of the different random numbers. However, the first encryption selection solution and the second encryption selection solution may be generated on the basis of a same random number. In a similar way, the above example has been assumed that the first encryption verification solution and the second encryption verification solution are generated on the basis of the different random numbers. However, the first encryption verification solution and the second encryption verification solution may be generated on the basis of a same random number.

The above example has assumed that the first encryption selection solution and the second encryption selection solution are generated on the basis of different encryption keys. However, the first encryption selection solution and the second encryption selection solution may be generated on the basis of a same encryption key. In a similar way, the above example has been assumed that the first encryption verification solution and the second encryption verification solution are generated on the basis of different encryption keys. However, the first encryption verification solution and the second encryption verification solution may be generated on the basis of a same encryption key.

The encryption selection solution and the encryption verification solution do not have to be updated. In other words, it is possible to omit the update section 44. The above example has assumed that a same encryption selection solution is registered on all the slave communication devices 35. However, different encryption selection solutions may be registered on the respective slave communication devices 35. The method of registering the encryption keys is not specifically limited. The arithmetic expressions (algorithms) for computing the encryption selection solution and the encryption verification solution are not specifically limited. In other words, the methods of generating the encryption selection solution and the encryption verification solution is not specifically limited. The encryption selection solution and the encryption verification solution are not essential. It is also possible to use a selection solution and verification solution that are not encrypted. At this time, the selection solution and the verification solution may be identical to each other or may be different from each other.

(Modification Related to Communication for Distance Measurement)

Regardless of the type of the trigger to start the communication for distance measurement, a timing of the communication for distance measurement may be a timing before the smart verification, may be a timing after the smart verification, or may be a timing during the smart verification. For example, in the case where the communication for distance measurement is executed before or during the smart verification, sometimes the process execution section 17 disables the successful smart verification. In such a case, the process execution section 17 may force the smart verification to quit before the smart verification finishes. In other words, it is sufficient for the process execution section 17 to perform some kind of process of preventing the smart verification (smart communication) from succeeding in the case where the successful smart verification is disabled.

The above example has mainly focused on the case where the measurement value Vm is measured on the basis of propagation time of the radio wave between the slave communication device 35 and the terminal 2. However, the method of measuring the measurement value Vm is not limited thereto. For example, in the case where one of the slave communication device 35 and the terminal 2 receives a radio wave transmitted from the other of the slave communication device 35 and the terminal 2, the one of the slave communication device 35 and the terminal 2 may measure strength of the received radio wave (received signal strength indicator (RSSI)), and may calculate a measurement value corresponding to the distance on the basis of the strength of the received radio wave. At this time, any one of the communication device 31 and the terminal 2 may only transmit the UWB radio wave Sa, and the other of the communication device 31 and the terminal 2 may only receive the UWB radio wave Sa.

The above example has assumed that the terminal 2 includes the UWB transmission/reception section 33. However, the terminal 2 does not have to include the UWB transmission/reception section 33. In such a case, it is sufficient for the communication device 31 to find a measurement value Vm on the basis of a result of receiving a reflected wave of a radio wave from the terminal 2.

The above example has mainly focused on the case where the measurement value Vm is measured by the measurement section 45a of the slave communication device 35 and the measurement section 45b of the master communication device 34. At this time, the slave communication device 35 and the master communication device 34 transmits respective ranging radio waves to the terminal 2. However, it is also possible for a structural element other than the slave communication device 35 or the master communication device 34 to measure the measurement value Vm. For example, the terminal 2 may measure the measurement value Vm. At this time, it is sufficient that the terminal 2 transmits respective ranging radio waves to the slave communication device 35 and the master communication device 34.

The above example has assumed that the terminal 2 transmits the UWB radio wave Sa for the first time. However, it is also possible for the communication device 31 to transmit the UWB radio wave Sa for the first time.

The above example has mainly focused on the case where the measurement section 45a of the slave communication device 35 measures the measurement value Vm. At this time, the slave communication device 35 transmits a ranging radio wave to the terminal 2. However, it is also possible for a structural element other than the slave communication device 35 to measure the measurement value Vm. For example, the terminal 2 may measure the measurement value Vm. At this time, it is sufficient to transmit the ranging radio wave from the terminal 2 to the slave communication device 35.

In addition, the radio wave may be transmitted by using a plurality of channels. At this time, the measurement section 32 may calculate the measurement value Vm on the basis of respective results of transmitting the radio wave by using the plurality of channels (propagation time or strength of received radio wave). The method of communication for distance measurement (ranging radio wave and response radio wave) is not limited to the method of using the UWB radio wave Sa. For example, a radio wave of another frequency may be used for the communication for distance measurement. As an example, Bluetooth (registered trademark) communication may be used for the communication for distance measurement.

The first communication between the terminal 2 and the communication device 31 is not limited to the communication for distance measurement. For example, it is sufficient that the first communication is communication for transmitting/receiving information.

The first communication between the terminal 2 and the communication device 31 may be communication for authenticating a communication partner. For example, examples of the communication for authenticating the communication partner include the communication for distance measurement, communication for ID verification, communication for authenticating biological information, and the like.

The first communication between the terminal 2 and the communication device 31 may be communication for operating the communication partner. Examples of the communication for operating the communication partner include communication for choosing song from a media player, communication for tuning a radio or adjusting sound volume, communication for operating a navigation system, communication for operating an air conditioner, communication for performing transition operation of the engine, and the like. In addition, the communication for operating the communication partner includes communication having a function of giving service to a user through lighting, display, or the like.

(Various Modifications of System)

The above example has assumed that only the master communication device 34 is directly connected to the verification ECU 8 among the plurality of communication devices 31. However, it is also possible for the plurality of communication devices 31 to be connected to the verification ECU 8. In addition, the communication devices 31 do not have to be classified into the master communication device 31 and the slave communication devices 35

The LF transmitter 13 may be installed in the vehicle 1 in such a manner that the LF transmitter 13 of the vehicle 1 forms an LF radio wave (wake signal) area around the vehicle 1. For example, the LF transmitter 13 of the vehicle 1 may form the LF radio wave area around a driver side door, around a front passenger door, around rear doors, and inside a vehicle cabin. The communication control section 38 may control actuation of the communication device 31 on the basis of the LF radio wave area formed by the LF transmitter 13. For example, in the case where the terminal 2 has entered the LF radio wave area around the driver side door and the outdoor smart verification has succeeded, the communication control section 38 actuates only the first slave communication device 35a and the third slave communication device 35c, which are close to the driver's seat, but does not actuate the other slave communication devices 35.

The above example has mainly focused on the case where the communication for distance measurement is performed in the case where the smart verification is conducted regardless of the type of the smart verification. However, even in the case where the smart verification is performed, it is also possible to control whether or not to perform communication for distance measurement, depending on the type of the smart verification. For example, in the case where the outdoor smart verification is conducted, the communication for distance measurement is not performed. However, the communication for distance measurement may be performed only in the case where the indoor smart verification is conducted. In other words, the communication control section 38 does not actuate the communication device 31 in an LF radio wave area formed outside the vehicle 1, but may actuate the communication device 31 in an LF radio wave area formed inside the vehicle 1.

The above example has mainly focused on the case where the verification ECU 8 includes the process execution section 17 that decides whether or not the smart verification has succeeded. However, the installation position of the process execution section 17 is not limited thereto. For example, the process execution section 17 may be included in the master communication device 34, may be included in the slave communication device 35, or may be included in the terminal 2. The above example has assumed that the master communication device 34 transmits the determination results obtained by the respective communication devices 31 to the verification ECU 8. At this time, it is possible for the master communication device 34 to transmit the determination results obtained by the respective communication devices 31 to the verification ECU 8 at different timings, or collectively transmit the determination results at a same timing.

The above example has assumed that the slave communication device 35 transmits a determination result indicating whether or not a measurement value Vm is valid to to the master communication device 34 as a result of the communication for distance measurement. However, it is also possible for the slave communication device 35 to transmit another determination result to to the master communication device 34 as the result of the communication for distance measurement. For example, as the result of communication for distance measurement, the slave communication device 35 may transmit information indicating level that represents degree of the measurement value Vm to to the master communication device 34. In the case where the master communication device 34 includes the process execution section 17, the slave communication device 35 may transmit information indicating whether to validate or invalidate a verification result obtained through the smart verification, to to the master communication device 34.

The above example has mainly focused on the case where the communication device 31 determines validity of the measurement value Vm corresponding to the distance between the device 31 and the terminal 2. However, it is also possible for the terminal 2 to determine the validity of the measurement value Vm. At this time, it is sufficient for the terminal 2 to notify the communication device 31 of the determination result of the validity of the measurement value Vm.

The frequencies of the radio waves and the communication methods used for various kinds of communication between the vehicle 1 and the terminal 2 may be changed into various embodiments.

The above example has mainly focused on the case where the wake signal is transmitted from the vehicle 1 to the terminal 2 in the smart verification system. However, the wake signal may be transmitted from the terminal 2 to the vehicle 1. The above example has mainly focused on the case of confirming whether or not the terminal 2 is right or wrong through verification of key IDs or through the request response authentication. However, the method of confirming whether or not the terminal 2 is right or wrong is not limited thereto. For example, the method of confirming whether or not the terminal 2 is right or wrong may be any method as long as it is possible for the terminal 2 and the vehicle 1 to confirm whether or not the terminal 2 and the vehicle 1 forms a valid pair through communication.

The above example has mainly focused on the case where the electronic key system 4 is the smart verification system that executes the smart verification. However, the electronic key system 4 is not limited to the smart verification system. For example, the electronic key system 4 may be any system as long as the system is capable of confirming whether the terminal 2 is right or wrong. Alternatively, it is also possible to omit the electronic key system 4, and confirm whether or not the terminal 2 is right or wrong through the UWB communication.

The above example has mainly focused on the case where the terminal 2 is the electronic key 5. However, the terminal 2 is not limited to the electronic key 5. For example, the terminal 2 may be an intelligent cell phone capable of wirelessly communicating with the vehicle 1.

The above example has assumed that the vehicle 1 includes the communication devices 31 and the verification ECU 8 (control device). However, the installation positions of the communication devices 31 and the verification ECU 8 (control device) is not limited to the vehicle 1, and the communication devices 31 and the verification ECU 8 (control device) may be installed in various kinds of devices or apparatus.

REFERENCE SIGNS LIST

1 vehicle
2 terminal
3 in-vehicle device
4 electronic key system
5 electronic key
15 volatile memory
17 process execution section
20 terminal control section
30 distance measurement system
31 communication device
45 measurement section
33 UWB transmission/reception section
34 master communication device
35 slave communication device
38 communication control section
39 interface section
40*a* volatile memory
40*b* volatile memory
42 acquisition section
43 communication section
44 update section
45 measurement section
46 verification section
47 update control section
48 authentication section
49 reception section

The invention claimed is:

1. A communication system, comprising:
a communication device configured to transmit a selection solution that is selected depending on a result of a first communication with an external device; and
a control device configured to receive the selection solution from the communication device through a second communication between the communication device and a communication partner that is different from the external device serving as a partner in the first communication,
wherein the control device checks the received selection solution against a verification solution prepared depending on the selection solution,
the communication device further transmits an encryption selection solution that is obtained by encrypting the selection solution,
the control device receives the encryption selection solution, and checks the encryption selection solution against an encryption verification solution that is obtained by encrypting the verification solution,
the communication device includes a first communication device and a second communication device,
the first communication device is configured to transmit a first encryption selection solution to the second communication device in response to the result of the first communication with the external device, and
the second communication device is configured to check the first encryption selection solution received from the first communication device against a first encryption verification solution prepared and to transmit a second encryption selection solution corresponding to the first encryption verification solution to the control device in a case where the first encryption verification solution is acquired, with the first encryption verification solution being compatible with the first encryption selection solution.

2. The communication system according to claim 1, wherein the encryption selection solution and the encryption verification solution are generated on a basis of encryption using a common key cryptosystem.

3. The communication system according to claim 2, further comprising:
an update control section configured to update the selection solution and the verification solution in a case where a predetermined condition is satisfied, wherein the communication device updates the encryption selection solution on a first basis of the updated selection solution and a first encryption key, and the control device updates the encryption verification solution on a second basis of the updated verification solution and a second encryption key that is common to the first encryption key.

4. The communication system according to claim 3, wherein the update control section determines that the predetermined condition is satisfied in a first case where communication for authenticating the external device is established, in a second case where a portion of authentication of the external device has succeeded, in a third case where a predetermined time has elapsed, or in a fourth case where a number of encrypted communications between the communication device and the control device reaches a predetermined number.

5. The communication system according to claim 1, further comprising:
    a first storage configured to store a plurality of encryption selection solutions; and
    a second storage configured to store a plurality of encryption verification solutions,
    wherein the communication device transmits the selection solution that is selected depending on the result of the first communication, among the plurality of encryption selection solutions stored in the first storage, and
    the control device checks the encryption selection solution received from the communication device against the plurality of encryption verification solutions stored in the second storage.

6. The communication system according to claim 1, wherein
    the communication device transmits the encryption selection solution corresponding to a normality determination result to the control device in a case where the result of the first communication indicates a normality determination result, and
    the communication device transmits the encryption selection solution corresponding to an abnormality determination result to the control device in a case where the result of the first communication indicates an abnormality determination result.

7. The communication system according to claim 6, wherein
    the first communication device transmits the first encryption selection solution corresponding to the normality determination result to the second communication device in the case where the result of the first communication indicates the normality determination result, and
    the first communication device transmits the first encryption selection solution corresponding to the abnormality determination result to the second communication device in the case where the result of the first communication indicates the abnormality determination result.

8. The communication system according to claim 7, wherein
    the second communication device receives the first encryption selection solution corresponding to the normality determination result and transmits the second encryption selection solution corresponding to the normality determination result to the control device in a first case where the first encryption verification solution is acquired, with the first encryption verification solution being compatible with the first encryption selection solution corresponding to the normality determination result, and
    the second communication device receives the first encryption selection solution corresponding to the abnormality determination result and transmits the second encryption selection solution corresponding to the abnormality determination result to the control device in a second case where the first encryption verification solution is acquired, with the first encryption verification solution being compatible with the first encryption selection solution corresponding to the abnormality determination result.

9. The communication system according to claim 1, wherein
    the second communication device transmits information indicating that the first encryption verification solution is not acquired to the control device in a case where the first encryption solution compatible with the received first encryption selection solution is not acquired.

10. The communication system according to claim 1, wherein the control device includes
    a reception section configured to receive the second encryption selection solution, and
    a verification section configured to check the second encryption selection solution against a second encryption verification solution.

11. The communication system according to claim 10, wherein
    the first encryption selection solution and the first encryption verification solution are generated on a first basis of first encryption using a common key cryptosystem, and
    the second encryption selection solution and the second encryption verification solution are generated on a second basis of second encryption using the common key cryptosystem.

12. A communication device, comprising:
    an acquisition section configured to acquire a selection solution that is selected depending on a result of a first communication with an external device; and
    a communication section configured to transmit the selection solution to a control device through a second communication with a communication partner that is different from the external device serving as a partner in the first communication,
    wherein the control device checks the received selection solution against a verification solution prepared depending on the selection solution,
    the communication device transmits an encryption selection solution that is obtained by encrypting the selection solution,
    the control device receives the encryption selection solution, and checks the encryption selection solution against an encryption verification solution that is obtained by encrypting the verification solution,
    the communication device includes a first communication device and a second communication device,
    the first communication device is configured to transmit a first encryption selection solution to the second communication device in response to the result of the first communication with the external device, and
    the second communication device is configured to check the first encryption selection solution received from the first communication device against a first encryption verification solution prepared and to transmit a second encryption selection solution corresponding to the first encryption verification solution to the control device in a case where the first encryption verification solution is acquired, with the first encryption verification solution being compatible with the first encryption selection solution.

* * * * *